June 20, 1933.  H. W. KAKASKA  1,914,920
POWER SHOVEL
Filed March 23, 1932  3 Sheets-Sheet 1
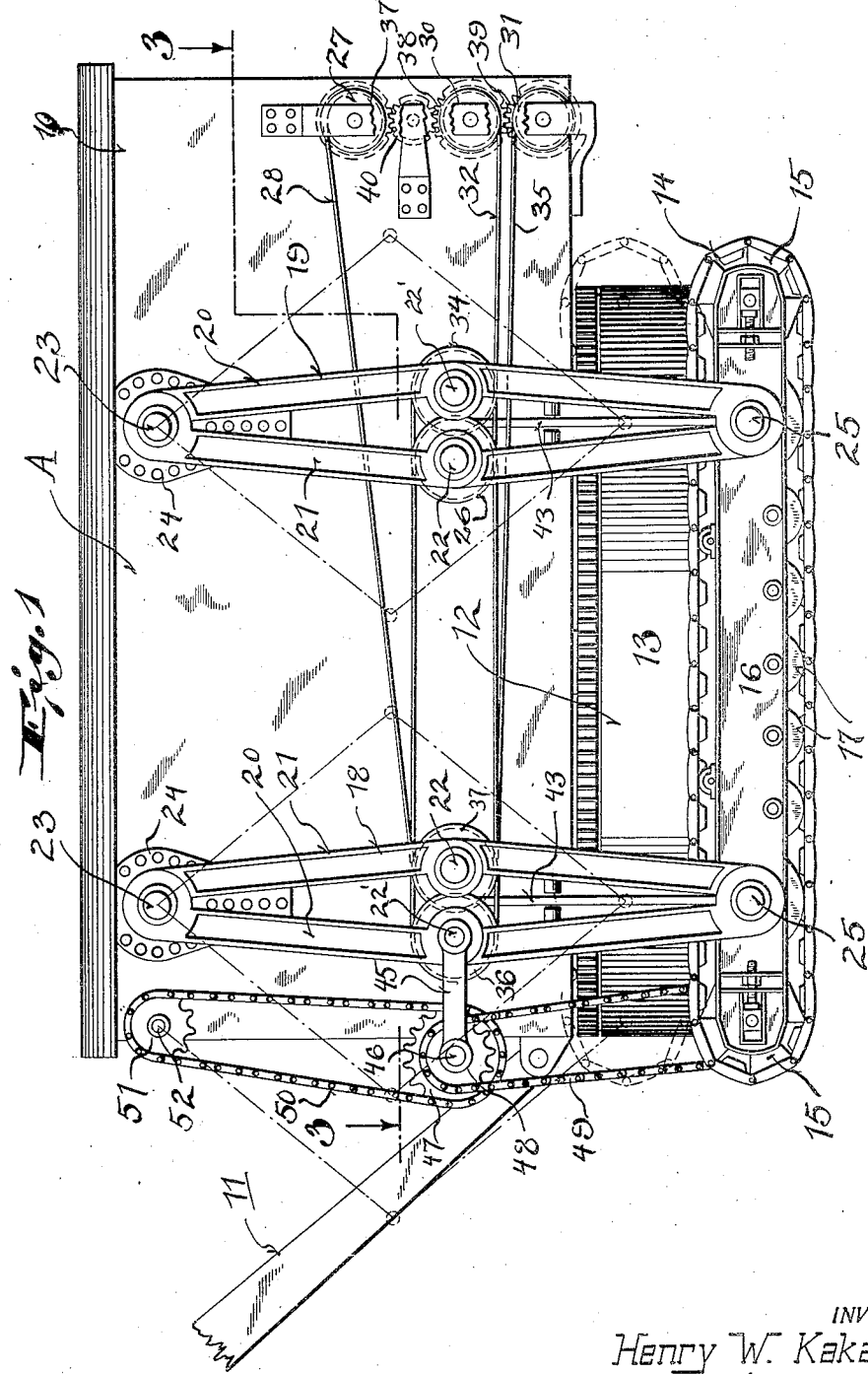
INVENTOR.
Henry W. Kakaska
BY
ATTORNEY.

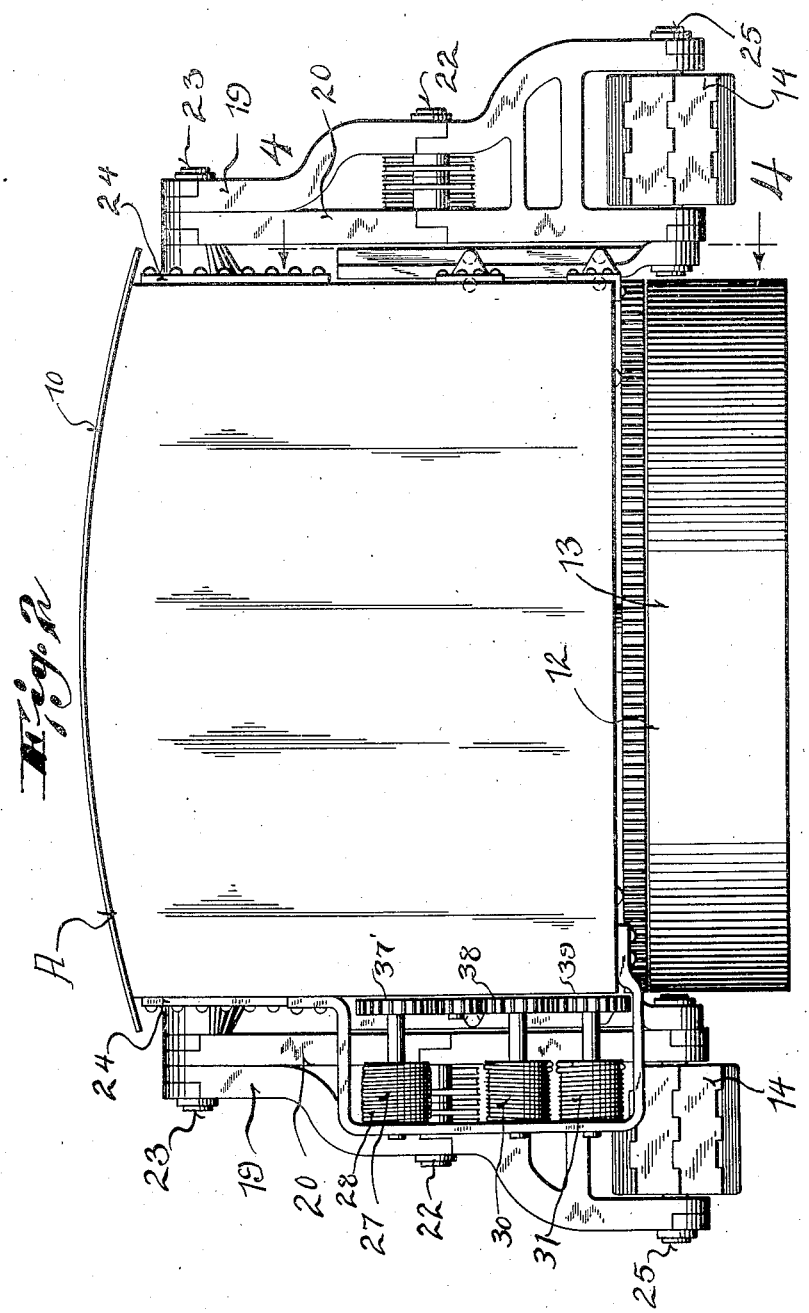

June 20, 1933.   H. W. KAKASKA   1,914,920
POWER SHOVEL
Filed March 23, 1932   3 Sheets-Sheet 3
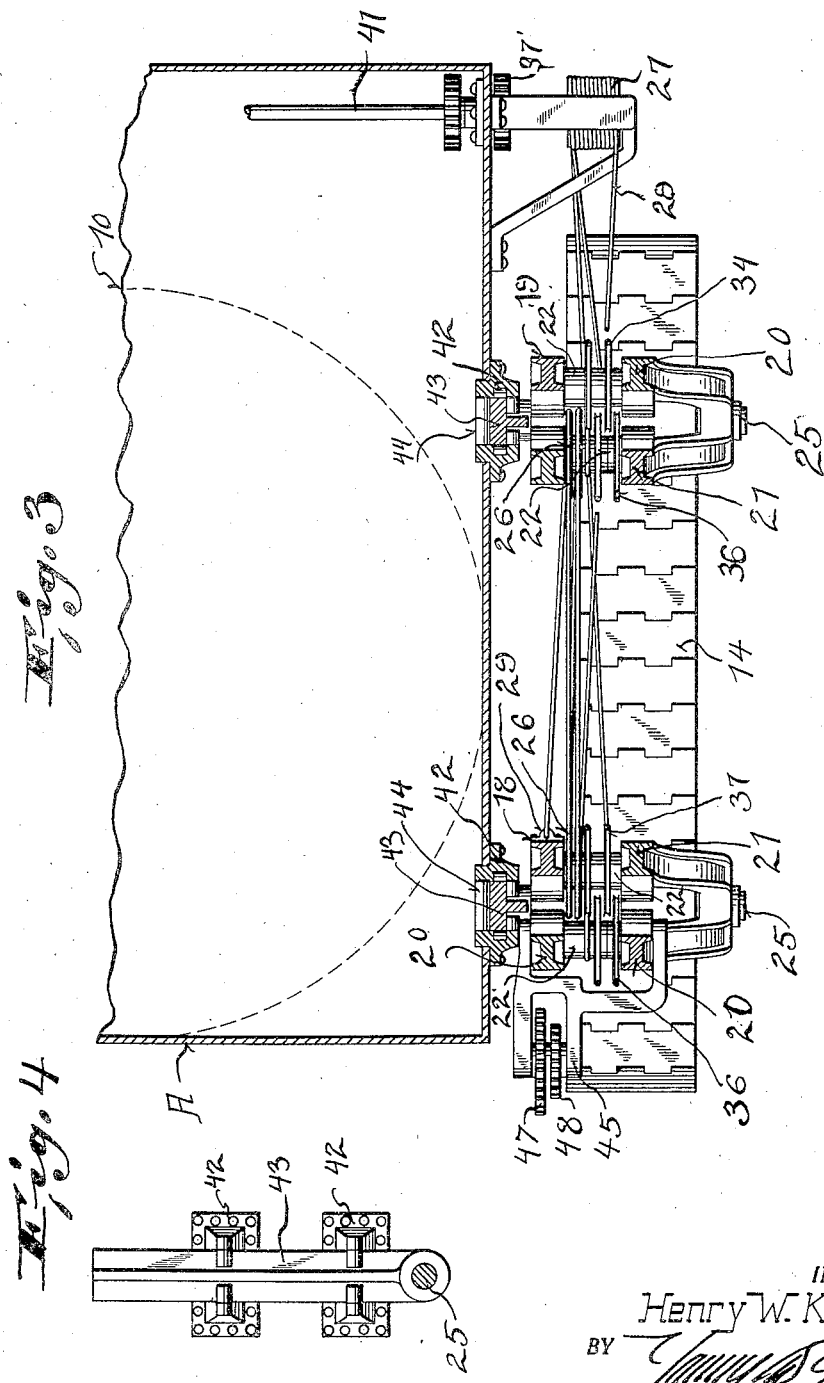
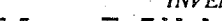
INVENTOR.
Henry W. Kakaska
BY
ATTORNEY.

Patented June 20, 1933

1,914,920

UNITED STATES PATENT OFFICE

HENRY W. KAKASKA, OF SOUTH MILWAUKEE, WISCONSIN, ASSIGNOR OF ONE-HALF TO FRANK HOLT, OF MILWAUKEE, WISCONSIN

POWER SHOVEL

Application filed March 23, 1932. Serial No. 600,655.

This invention relates to power shovels, cranes, draglines, or similar devices, and is an improvement on my pending application Serial No. 591,330, filed February 6th, 1932.

In devices of this character, an endless propelling track for supporting the cab and other operating parts of the machine is provided, and the cab is mounted on a suitable turntable, whereby the shovel can be swung around for receiving and delivering the excavated material. Due to the weight of the apparatus, severe strain is imposed on the track shoes, during the turning of the cab, and while the apparatus is in operation. Also in confined places, considerable difficulty is often encountered in turning the entire machine around on the propelling tracks.

As set forth in my pending application above mentioned, it is one of the objects of the invention to provide means whereby the endless propelling tracks can be raised and lowered above the turntable, whereby the base of the turntable may engage and rest upon the ground, so as to form a rigid ground-engaging structure and thereby relieve weight and strain from the tracks during the operation of the machine and to permit the swinging and convenient turning around of the machine.

One of the main objects of my present invention is to provide novel means for supporting the endless propelling tracks from the frame of the cab of the machine, so that the tracks and cab can be moved in parallel relation to one another, and in a straight line without any difficulty on the part of the operator and without undue strain on any part of the apparatus.

Another object of my invention is the provision of the use of toggle devices for connecting the endless propelling tracks with the frame cab, with novel means including winding drums and pulleys for actuating the toggle devices, whereby the toggle devices can be straightened out or collapsed to effectively raise or lower the propelling tracks.

A further important object of my invention is the provision of novel guide means between the frame of the cab and the endless propelling tracks, so that the tracks will always be held in proper alignment during the raising and lowering thereof.

A still further object of my invention is the provision of novel means for actuating the endless tracks, so that the drive thereof can be taken care of incident to the raising and lowering of the tracks.

With these and other objects in view, the invention consists in the novel construction, arrangement and formation of parts, as will be hereinafter more specifically described, claimed and illustrated in the accompanying drawings, in which:

Figure 1 is a fragmentary side elevation of a power shovel or other similar excavating apparatus, showing the usual endless propelling tracks in their lowered position in full lines and in their raised elevated position in dotted lines;

Figure 2 is a rear elevation of the power shovel, showing the tracks in their raised position, the base of the turntable resting on the ground to permit the free turning of the entire device thereon, the operating drums on one side being removed for the purpose of illustrating structural details.

Figure 3 is a fragmentary horizontal section taken substantially on the line 3—3 of Figure 1, looking in the direction of the arrows, illustrating the novel operating means for the toggle devices for bringing about the raising and lowering of the tracks;

Figure 4 is a detail section illustrating the guide means for the endless tracks incident to the raising and lowering thereof, the section being taken substantially on the line 4—4 of Figure 2, looking in the direction of the arrows;

Referring to the drawings in detail, wherein similar reference characters designate corresponding parts throughout the several views, the letter A generally indicates a power shovel or similar excavating apparatus. The power shovel is of substantially the usual construction and embodies the cab 10 carrying the swinging boom 11 for the shovel (not shown). The cab 10 is mounted for rotary movement upon a suitable turntable structure 12, which according to my invention embodies an enlarged ground-engaging base 13 and the cab with the various parts of the shovel rotate on the base.

In the present instance, the base 13 has been shown to be of a circular form in plan, but it is to be understood that any desired type of base may be employed, providing the same gives an adequate supporting face for engaging the ground to support the entire machine.

Mounted on opposite sides of the machine are the longitudinally extending endless propelling tracks 14. These tracks 14 travel around sprocket wheels 15 rotatably supported at the terminals of the track supporting beams 16.

These beams 16 carry the usual idler wheels 17 for engaging the runs of the endless tracks, so as to insure the proper engagement thereof with the ground during movement of the device.

As heretofore brought out, my invention primarily resides in the novel means employed for connecting the track supporting beams 16 with the cab or body of the machine, whereby the tracks on each side of the machine can be raised or lowered as a unit in a straight path for bringing the base 13 of the turntable into and out of engagement with the ground.

The means for bringing about the raising and lowering of the tracks embodies novel front and rear toggle devices 18 and 19 arranged on each side of the machine. Each of these toggle devices are constructed identically and each embody opposed toggle joints 20 and 21 arranged for movement toward and away from one another. The opposed toggle joints 20 and 21 for the sake of strength are made in pairs, as clearly shown in Figures 2 and 3 of the drawings. The lower ends of each of the pairs of the toggle joints 20 and 21 are pivotally connected together and to the track beams 16, as at 25, on opposite sides of the beams. The upper ends of the pairs of toggle joints 20 and 21 are rockably mounted on a common stub shaft 23 rigidly secured to a face plate 24, bolted or otherwise connected with the frame of the cab or the body of the machine.

In order to bring about the breaking or collapsing of the toggle joints, so that the tracks can be raised, each of the facing pairs of toggle joints 21 of the toggle devices 18 and 19 are connected at their pivots by a cross shaft 22 on which is mounted a plurality of idler pulleys 26. A winding drum 27 is provided for each side of the cab and these winding drums have wound thereabout, the cables 28. As heretofore set forth, the toggle devices and the operating means therefor are duplicated on each side of the machine and thus the operating means for the toggle devices for one side will only be described in detail. The cable 28 is trained about one of the idler pulleys 26 carried by the toggle device 18 and is then led to an idler pulley carried by the toggle device 19.

As shown in Figure 3, the cable is trained back and forth over the various idler pulleys and is finally secured as at 29 to the toggle device 18. By this construction so far, it can be seen that when the cable 28 is wound upon the drum 27, the idler pulleys 26 of the toggle devices 18 and 19 will be brought toward one another to bring about the collapsing of the toggle devices and the consequent raising of the endless propelling tracks.

In order to bring about the straightening of the toggle devices 18 and 19 to lower the endless tracks, the outer pairs 20 of the toggle levers are connected together by cross shafts 22' and these cross shafts have mounted thereon, a plurality of idler pulleys 36. Similar idler pulleys 37 are mounted on the cross shafts 22 heretofore referred to.

Winding drums 30 and 31 are disposed below the winding drum 27 and the drum 30 has wound thereabout, a cable 32. This cable 32 is trained about the adjacent pulleys 36 and 37 carried by the cross shafts 22 and 22' of the toggle device 19 and the end of this cable is attached to a cross shaft.

A similar cable 35 is wound upon the drum 31 and extends from the drum and is wound about the pulleys 36 and 37 carried by the cross shafts 22 and 22' of the toggle device 18. The end of this cable is attached to the cross shaft 22.

Obviously, when the cables 32 and 35 are wound upon their drums 30 and 31, these cables will draw the cross shafts 22 and 22' of the toggle joints 20 and 21 toward one another and thereby bring about the straightening of the toggle devices for lowering the tracks.

Connected with the winding drums 27, 30 and 31 are gear wheels 37', 38 and 39, respectively. The gear wheel 37' and the gear wheel 38 mesh with the opposite sides of a drive pinion 40, keyed or otherwise secured to the drive shaft 41. This drive shaft 41 is driven in any desired manner from the prime mover of the power shaft. The gear 39 meshes with the gear 38 and consequently the drum 31 is driven with the drum 30, but in a direction opposite thereto.

Obviously, as the cable 28 is wound upon the drum 27, the cables 32 and 35 will be paid off of the drums 30 and 31. Likewise, when the cables 32 and 35 are wound upon the drums 30 and 31, the cable 28 will be paid off from the drum 27. To insure the proper guiding of the tracks during their rising and lowering movement, the sides of the cab 10 or body of the machine can be provided with guideways 42 for receiving guide arms 43 connected with the beams 16 of the tracks.

These guides 42 can be provided with anti-friction rollers 44, so as to facilitate the sliding of the standards or guide arms 43 in the said guides.

It will be noted that the anti-friction rollers 44 engage the front and rear faces and side edges of the said standards.

I have provided novel means for driving the endless tracks, so as to insure the proper operation thereof when the same are in their lowered driving position. This means includes forwardly extending supporting brackets 45 rigidly carried by the front pair of toggle members. The supporting arms 45 carry a counter shaft 46 on which is keyed sprocket wheels 47 and 48. The sprocket wheel 48 has trained thereabout, the drive sprocket chain 49 which leads to the drive sprocket for the endless tracks. The sprocket chain 50 is trained over the sprocket wheel 47 and leads over a second sprocket wheel 51 keyed or otherwise secured to a drive shaft 52, which is driven from the prime mover of the power shovel in any desired way.

By this arrangement of parts, all slack in the sprocket chains 49 and 50 will be taken care of during the raising and lowering of the endless tracks.

While I have illustrated one specific means for actuating the toggles consisting of pulleys and cables, it is to be understood that other operating means for actuating the toggles can be employed. Thus, it may be desirable to operate the toggles by the use of travelling screws and feed nuts arranged at the pivot points of the toggles.

From the foregoing description, it can be seen that I have provided an exceptionally simple and novel mechanism for raising and lowering the endless propelling tracks of a power shovel, so that the base of the turntable of the machine may sit solid on the ground during the turning of the body portion of the machine.

Changes in details may be made without departing from the spirit or the scope of my invention, but what I claim as new is:

1. In combination with a power device of the class described including a base and a cab rotatably mounted thereon, endless propelling tracks therefor, pairs of facing toggle joints connecting the cab and track, and means including cables and pulleys for moving the pivot points of the toggle joints toward and away from one another as and for the purpose specified.

2. In combination with a power device of the class described including a base and a cab rotatably mounted thereon, an endless propelling track mounted on each side of the cab and base, front and rear pairs of toggle joints connected to the tracks and cab, a plurality of idler pulleys carried by the pivot points of the toggle joints, a plurality of winding drums, a cable wound upon one of the drums and connecting the pulleys of the inner toggle joints of the pairs of toggle joints together, whereby to break the toggle joints for raising the track relative to the cab and base, cables wound upon the other drum, one of the last mentioned cables being wound upon the pulleys of the toggle joints of one pair of toggle joints, and the other cable being wound upon the pulleys of the toggle joints of the other pair of toggle joints.

3. In combination with a power device of the class described including a base and a cab rotatably mounted thereon, an endless propelling track mounted on each side of the cab and base, front and rear pairs of toggle joints connected to the tracks and cab, a plurality of idler pulleys carried by the pivot points of the toggle joints, a plurality of winding drums, a cable wound upon one of the drums and connecting the pulleys of the inner toggle joints of the pairs of toggle joints together, whereby to break the toggle joints for raising the track relative to the cab and base, cables wound upon the other drum, one of the last mentioned cables being wound upon the pulleys of the toggle joints of one pair of toggle joints, and the other cable being wound upon the pulleys of the toggle joints of the other pair of toggle joints, and means for synchronously operating the winding drums.

4. In combination with a power device of the class described including a base and a cab rotatably mounted thereon, an endless propelling track therefor arranged on each side of the cab, front and rear pairs of toggle joints connected at their ends of the cabs and tracks, a plurality of idler pulley wheels carried by the pivot points of the toggle joints, a winding drum, a cable wound upon the drum and trained about certain of the pulleys of the facing toggle joints of the pairs of toggle joints and secured to one of said toggle joints, a pair of winding drums having intermeshing gears, independent cables wound upon the last mentioned drums, one of said cables being wound about certain pulleys of one pair of toggle joints, and connected with one of said joints, the other cable being trained about certain pulleys of the other pair of toggle joints and anchored to one of the same, a drive shaft, a gear on the drive shaft meshing with one of the gears carried by the pair of drums and a gear on the first mentioned drum meshing with the gear on the drive shaft.

5. In combination with a power device of the class described including a base and a cab rotatably mounted thereon; endless propelling tracks arranged on each side of the cab, pairs of facing toggle joints connecting the cab and tracks, means for straightening and breaking the toggles, whereby to raise and lower the tracks in a vertical plane relative to the cab, pivoted guide bars connected with the pairs of toggle joints, and guides connected with the sides of the cab receiving said guide bars.

6. In combination with a power device of the class described including a base and a cab rotatably mounted thereon, an endless propelling track arranged on each side of the base, means including pairs of toggle joints for raising and lowering the tracks relative to the cab, means for driving the tracks including a counter shaft carrying sprocket wheels, a drive shaft and sprocket chain for driving one of said gears, a sprocket chain trained over the last sprocket wheel for the tracks, and a supporting bracket for the counter shaft carried by the pivot point of one of the toggle joints.

In testimony that I claim the foregoing I have hereunto set my hand at Milwaukee, in the county of Milwaukee and State of Wisconsin.

HENRY W. KAKASKA.